(12) United States Patent
Stegall

(10) Patent No.: US 8,545,299 B2
(45) Date of Patent: Oct. 1, 2013

(54) DYNAMIC PUZZLE GENERATION

(75) Inventor: David C. Stegall, Los Angeles, CA (US)

(73) Assignee: David C. Stegall, Los Angeles, CA (US)

(*) Notice: Subject to any disclaimer, the term of this patent is extended or adjusted under 35 U.S.C. 154(b) by 0 days.

(21) Appl. No.: 13/246,694

(22) Filed: Sep. 27, 2011

(65) Prior Publication Data

US 2013/0079077 A1    Mar. 28, 2013

(51) Int. Cl.
*G06F 17/00* (2006.01)

(52) U.S. Cl.
USPC .................................................. 463/9

(58) Field of Classification Search
USPC .............. 463/9, 10, 14; 273/271–273, 274, 273/276, 283, 284
See application file for complete search history.

(56) References Cited

U.S. PATENT DOCUMENTS

| | | | | |
|---|---|---|---|---|
| 6,378,867 B1* | 4/2002 | Shalless | | 273/240 |
| 7,972,205 B2* | 7/2011 | Krishna | | 463/9 |
| 2002/0117802 A1* | 8/2002 | Seaberg | | 273/153 R |
| 2003/0060250 A1* | 3/2003 | Chan | | 463/9 |
| 2003/0139210 A1* | 7/2003 | Raben | | 463/9 |
| 2004/0162126 A1* | 8/2004 | Rehm et al. | | 463/9 |
| 2006/0281512 A1* | 12/2006 | Rehm | | 463/9 |
| 2007/0182097 A1* | 8/2007 | Dowe | | 273/272 |
| 2011/0256513 A1* | 10/2011 | Levitt et al. | | 434/185 |
| 2012/0108306 A1* | 5/2012 | Munsell et al. | | 463/9 |

* cited by examiner

*Primary Examiner* — Ronald Laneau
(74) *Attorney, Agent, or Firm* — Novak Druce Connolly Bove + Quigg LLP

(57) ABSTRACT

Disclosed herein are systems and methods for providing a power-puzzler computer generated crossword puzzle which employs a unique and original combination of technology-based features to offer puzzlers of all skill levels a richer and more enjoyable crossword puzzle gaming experience. A master puzzle database (MPDB) consisting of clues and solutions associated with metadata is created and utilized to offer numerous improvements over previous crossword puzzle games. Features include offering multiple clues of varying difficulty for the same solution and improvement features to help a puzzler understand and develop crossword strategies, skills and techniques. Unique scoring is offered based on multiple variables such as level of difficulty, elapsed time to complete the puzzle, percentage of solutions correct, etc. Puzzlers can also create custom puzzles by defining game parameters such as categories of interest, level of difficulty and desired time to complete. Puzzler performance can be stored in a user profile.

20 Claims, 8 Drawing Sheets

DYNAMIC PUZZLE GENERATION

BACKGROUND

1. Technical Field

The present disclosure relates to development and use of a puzzle database and more specifically to dynamic generation of crossword puzzles based on the puzzle database.

2. Introduction

Millions of people in the United States today do crossword puzzles. While many enjoy doing crosswords, many of these puzzlers consider certain puzzles too difficult even to attempt. As a result, they choose to avoid puzzles, which may, in fact, not be beyond their capabilities. Additional millions avoid crossword puzzles altogether because of a belief that they are too difficult. Moreover, at present, there is no means of allowing multiple players or groups of players of different ages, demographic backgrounds and breadth of general knowledge either to compete against or cooperate with each other in an effective, enjoyable and meaningful way in completing a puzzle.

With a moderate amount of experience designed specifically to help them better understand clues, in particular the more difficult, ambiguous or even deliberately misleading clues, reluctant, novice or relatively unskilled puzzlers would be able to achieve dramatic improvement and to succeed in completing puzzles that are currently seen as too difficult. If puzzlers of all ages and abilities were further able to pursue information in a variety of multimedia formats pertaining to a clue and its solution they would almost certainly find puzzling to be more rewarding and enjoyable, as well as increase their knowledge and understanding of the world around them, whatever age they may happen to be.

The application of technology to crosswords has, to date, been limited primarily to the ability to do crossword puzzles in their traditional form and format on a computer or more recently handheld mobile device. While advances have been made, they have failed to match in any respect the opportunities made available by current technology to provide the puzzler an opportunity to improve, succeed, learn, grow and develop and maintain social contacts and connections, both individually and as part of a family or social group.

In short, there is a great opportunity for every puzzler of any age or ability, from the novice to the most experienced, to improve both her or his success at and enjoyment of puzzling, and for puzzling to provide a unique basis for social contacts and discourse wherever a puzzler or prospective puzzler happens to be.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems and methods for providing a power-puzzler computer generated crossword puzzle which can be played either individually or as part of a social network. Power-puzzler is a crossword puzzle application, capable of being played either individually or as part of a social network, which employs a unique and original combination of technology-based features to offer puzzlers of all skill levels and demographic backgrounds a richer, more enjoyable and, where desired, more social crossword puzzle gaming experience. By creating and utilizing a rich master puzzle database (MPDB), power-puzzler offers puzzlers numerous improvements over previous crossword puzzle games. In addition to traditional gameplay, power-puzzler offers gameplay options focused not only on making the game accessible to players of all ages, demographic backgrounds and skill levels but on allowing them to compete with each other, even when their puzzling skills and breadth of general knowledge vary significantly. One unique feature designed to further this goal is the availability of multiple clues of varying difficulty for the same solution. Power-puzzler puzzles can also offer multiple improvement features to help a puzzler understand and develop crossword strategies, skills and techniques fundamental to success. Unique scoring options, which facilitate individual improvement as well as effective and meaningful competition and cooperation among puzzlers, are also offered. Scoring options can be based on multiple variables including the level of difficulty of a clue/solution, the elapsed time to complete a clue or the entire puzzle, the percentage of solutions correct, a puzzler's individual demographic and puzzler profile and other factors such as the reliance on various improvement features and other solution aids. Power-puzzler also enables puzzlers to create puzzles tailored to their preferences and capabilities. Puzzlers can customize their own puzzles by defining game parameters such as categories of interest, level of difficulty, desired time to complete and their unique demographic and puzzler profile. Power-puzzler can also offer a rich gaming and social experience by providing clues and solutions which have been linked to related information on the web as well as allowing puzzlers to create a user profile to store demographic background, personal preferences with respect to areas of interest and expertise and the puzzler's personal history and experience with power-puzzler.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
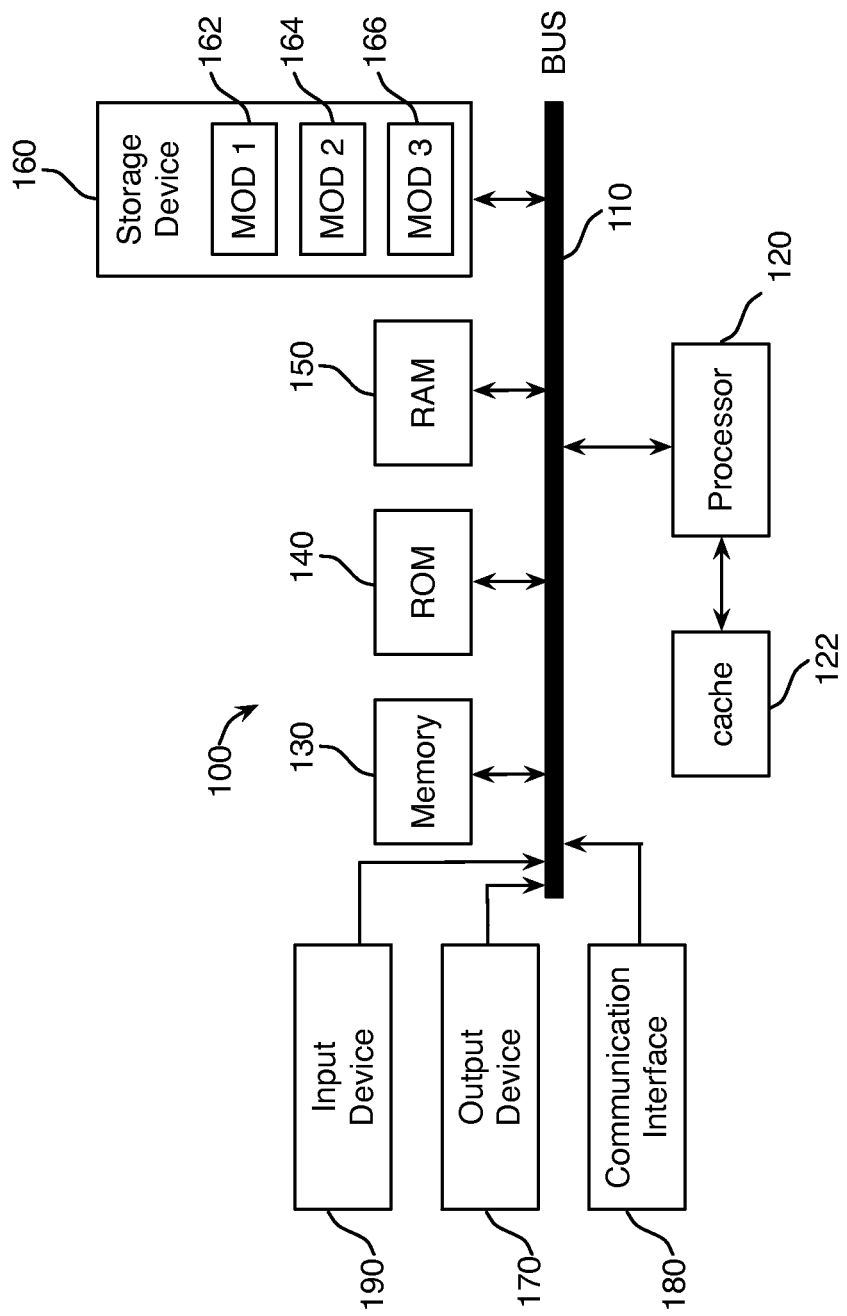
FIG. 1 illustrates an exemplary system embodiment.

FIG. 1 illustrates an exemplary system 100 that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

DEFINITIONS

A 'puzzler' is a person playing a crossword puzzle game.

An 'open cell' is the blank space in a crossword puzzle in which nothing has been entered and into which something, usually but not always a single letter, is to be inserted in order to complete the solution.

A 'closed cell' is a square in a crossword puzzle, which is filled (usually in black) to separate open cells (one solution) from each other (a different solution) and into which nothing is or can be entered.

The 'grid' is the entire presentation of all open and closed cells of a crossword puzzle.

A 'clue' is the information provided to assist the puzzler in arriving at the correct 'solution' to be inserted in the grid.

The 'solution' to a clue is the set of letters or other symbols which comprise the correct entry on the grid with respect to the clue.

The 'original puzzle' is the puzzle as it was originally constructed and presented to its intended audience.

A 'custom puzzle' is a puzzle containing clues and/or solutions which are based upon a variety of possible selections made by a puzzler.

Power-puzzler is a crossword puzzle application which employs a unique and original combination of technology-based features to offer puzzlers of all skills levels and demographic backgrounds a richer, more robust, more diverse more enjoyable and, in those instances in which puzzles are solved competitively or cooperatively, a more equitable and demographically appropriate crossword puzzle gaming experience. By creating and utilizing a rich master puzzle database (MPDB), power-puzzler offers puzzlers numerous improvements over previous crossword puzzle games. In addition to traditional gameplay, power-puzzler offers gameplay options focused on making the game accessible to players of all demographic backgrounds and skill levels. The fundamentally unique feature designed to achieve this goal is the availability of multiple clues of varying difficulty for the same solution. Power-puzzler puzzles can also offer multiple improvement features to help a puzzler understand and develop crossword strategies, skills and techniques fundamental to success. Unique scoring options are also offered. Scoring options can be based on multiple variables such as level of difficulty, elapsed time to complete an individual clue or the entire puzzle, percentage of solutions correct, as well as the demographic background or profile of the puzzler. Power-puzzler also enables puzzlers to create puzzles tailored to their specific preferences and interests. Puzzlers can customize their own puzzles, as well as compete and cooperate with other puzzlers, by defining game parameters such as categories of interest, level of difficulty, desired time to complete and demographic profile. Power-puzzler can also offer a rich personal as well as social gaming experience by providing clues and solutions which have been linked to related information on the web as well as allowing puzzlers to create a user profile to store demographic background, preferences and data reflecting a puzzler's past history on power-puzzler.

Figure 2:
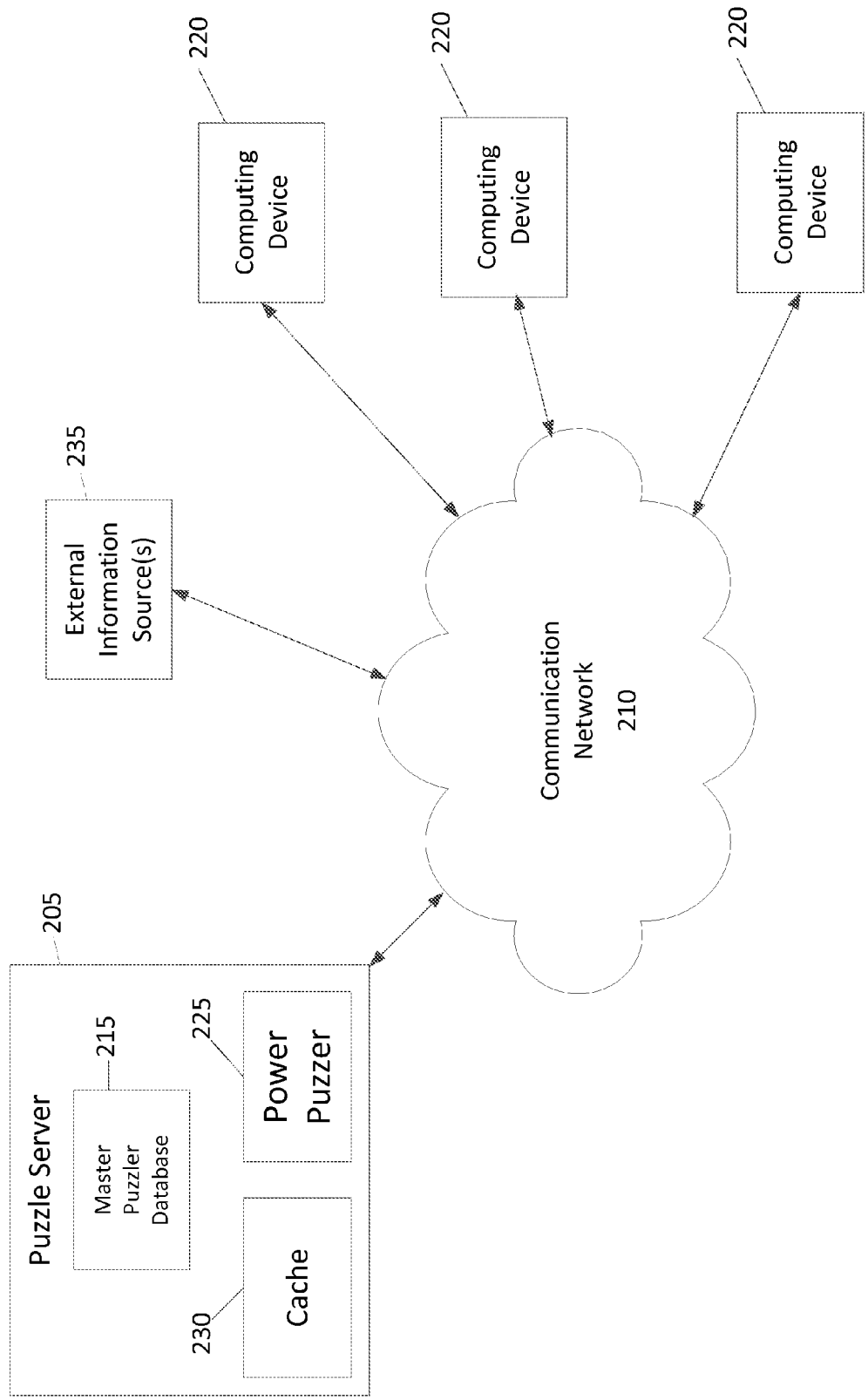
FIG. 2 illustrates an exemplary computing system in which power-puzzler can be implemented.

Having briefly described the power-puzzler application, the disclosure now turns to FIG. 2 which illustrates an exemplary computing system in which power-puzzler can be implemented. As illustrated, a puzzle server 205 can be connected to any number of computing devices 220 by a communication network 210. The puzzle server 205 can be a computing device similar to the one disclosed in FIG. 1. As illustrated, the puzzle server 205 can include a master puzzler database (MPDB) 215 and a master puzzler cache 230. In some embodiments the puzzle server can host and execute the power-puzzler application 225, for example as a cloud based system.

Figure 3:
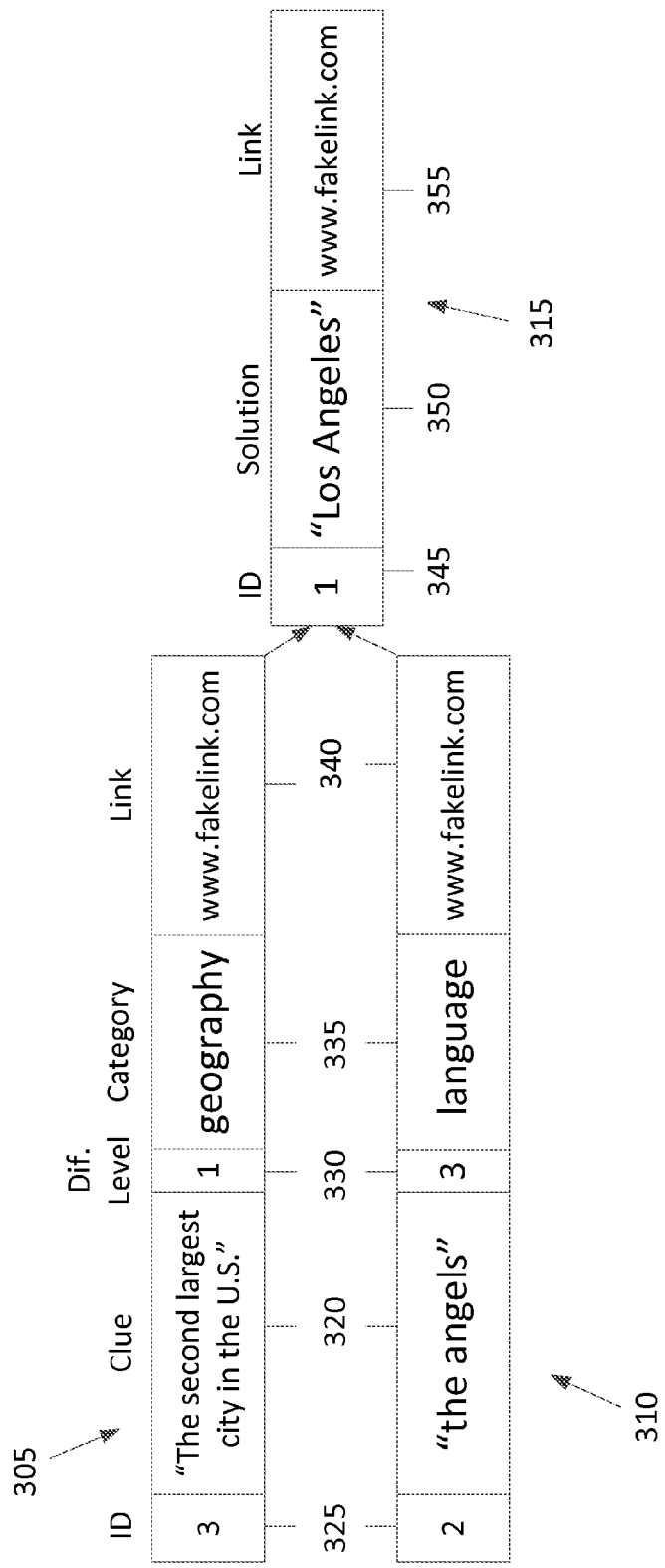
FIG. 3 illustrates exemplary master puzzler database entries.

The MPDB 215 is a database that can store and organize data used by power-puzzler 225 to create puzzles. The data stored in the master puzzler database 215 can include a plurality of clues and corresponding solutions. Each clue and its corresponding solution can be stored in the MPDB 215 as independent, but related, elements. Further, multiple clues can be associated with the same solution. For example, as illustrated in FIG. 3, the clue "the $2^{nd}$ largest city in the U.S.," 305 and the clue "the angels," 310 can both have the same solution "los angeles," 315 since Los Angeles is the second largest city in the U.S. and the Spanish translation of 'the angels.' Further, metadata describing the clues and solutions can be stored and associated with each clue and solution. The metadata can include any type of data describing or relating to a clue or solution, such as ID number, level of difficulty, source information, category, notes, theme, hyper-link to related material, etc.

While the puzzle server is illustrated as being hosted on a server accessible via a network, in some embodiments, the puzzle server can be encompassed in an application running locally on the devices 220.

External Information Source(s) 235 can be a website(s) of information related to clues or solutions. In some embodiments, the External Information Source(s) can be an advertisement provider. As illustrated in FIG. 2, the External Information Source(s) 235 can communicate with a Computing Device 220 or communicate with the Puzzle Sever 205 through Communication Network 205.

FIG. 3 illustrates exemplary MPDB entries. As illustrated, there are two clues 305 and 310 and both are associated with solution 315. The illustrated entries represent only a small sample of the many more potential database entries. Each clue includes a clue text data field 320 which stores the text of the clue. For example, clue 305 is "the second largest city in the U.S." and clue 310 is "the angels" and this text is stored in the clue text data field 320. In addition to the clue text data, each clue can also include an ID number 325, difficulty level 330, category 335, and link 340 data field.

The ID data field 325 can simply be used to identify the clue, for example clue 305 has an ID number of 3 and clue 310 has an ID number of 2.

The difficulty data field can be used to rank the anticipated difficulty of determining the solution based on the clue. The difficulty level can be ranked based on any criteria or using any scale. For example, the clue "the second largest city in the U.S." has a difficulty level of 1 because it is fairly common knowledge that Los Angeles is the second largest city in the U.S., whereas the clue "the angels" has a difficulty level of 3 because the solution is not as readily apparent. In some embodiments, the age of a particular puzzler, as well as other demographic elements, can also be a factor in determining the difficulty level of a particular clue.

The category data field 335 can be used to categorize the clue by subject. For example clue 305 has been categorized as geography and clue 310 has been categorized as language. In some embodiments, clues can be categorized by comparing key words and phrases in both the clues and solutions to a glossary of qualifying terms for each category and a glossary of disqualifying terms. If key words match with terms in the glossary of qualifying terms, the category associated with the qualifying terms can be assigned as the category of the clue and solution. If, however, other keywords in the same clue and solution are matches with keywords in the glossary of disqualifying terms for the same category as the previous matches, the category will not be assigned. A given clue/solution combination can have multiple categories designations, depending upon the clue provided or, in some embodiments, based simply on the solution alone. Such categories can also provide a foundation for targeted advertising to puzzlers which may be specifically related to the subject matter of the clue/solution.

Finally, both clues 305 and 310 include a link data field. The link data field can include a link to sources of additional information, explanation and entertainment, related to the clue. For example, clue 305 may include a link to a list of the largest cities worldwide, or information on Los Angeles. In some embodiments, the clue or solution can include uncommon or foreign language words and so the link can be to a definition and pronunciation of the word. As illustrated, both clue 305 and 310 are associated with a solution 315. Therefore, either clue can be presented to a puzzler to get the same solution. The solution 315 includes ID 345, solution text 350, and link 355 fields, each similar to those described for clues 305 and 310.

Returning to FIG. 2, to create the greatest possible number and variety of clues and solutions within the MPDB 215, the clues and solutions can be 'harmonized' to fit with multiple forms of the same base word, to the extent possible. For example, the clue "headwear" calling for the solution "hat" can be converted to be compatible with either the solution "hat" or "hats." Alternatively, if the clue is "sombrero" both the clue and the solution can be converted so that the clue "sombreros" is created and requires the solution "hats." The same process can be used with verb-based solutions. For example, the clue "have fun" calling for the solution "play," can be harmonized to be compatible with the solutions "plays," "played," and "playing" by converting the clue to "has fun," "had fun," and "having fun," as necessary.

In addition to puzzle data, the MPDB 215 can also create and store user profile information including demographic background and puzzling history gathered about a puzzler. This can include personal demographic data about a puzzler such as name, address, age, gender, interests, occupation, education, etc., as well as preference data concerning areas of expertise and interest. A user profile can also include information gathered about a puzzler in regards to their performance solving puzzles. For example, the user profile can gather the length of time it takes a puzzler to enter solutions to clues of varying difficulty and in different categories, as well as the accuracy of those answers. In some embodiments, this data can be aggregated for all puzzlers and used in determining and adjusting the difficulty level of clues based on actual puzzler performance.

User profile data can also be used as the basis for a "handicapping" system of equalizing players of varying levels of skill and knowledge and thereby facilitating and improving the competitive and cooperative aspects of power-puzzler as a social networking application. A puzzler's "handicap" can be indicative of the puzzler's skill level. A novice or relatively unskilled puzzler can be referred to as having a large handicap, whereas a skilled puzzler can be said to have a small handicap. A puzzler's profile can roughly approximate the level of difficulty of puzzles which a puzzler is able to complete with a prescribed level of accuracy. This handicapping system can allow members of a family or other social group, varying greatly in age and/or knowledge, to be able to participate more equally either as competitors or collaboratively in power-puzzler, creating a more open and enjoyable experience.

The data stored in the MPDB 215 can be searched and extracted by the power-puzzler application 225 to create puzzles. In some embodiments power-puzzler 225 can create a puzzle by re-using a layout of solutions from a previously created puzzle and substitute different clues associated with the solutions. In some embodiments power-puzzler 225 can create a puzzle to conform to parameters such as a number of solutions, and size dimensions of the grid. Once power-puzzler has created a puzzle, the puzzle can be stored in the master puzzler cache 230.

In addition to creating puzzles, the power-puzzler application 225 also provides a graphical interface for puzzlers to interact with and solve puzzles as well as interface with the application. In some embodiments, puzzlers can interface with the application to set settings or choose puzzles to solve. In some embodiments, the power-puzzler application 225 can be running on the puzzler server 205 and accessed by a computing device 220 through use of the communication network 210. In some embodiments the power-puzzler application 225 can be downloaded to a computing device 220 and run from the computing device 220. In this type of embodiment, puzzles can also be downloaded from the puzzle server 205 so that the communication network 210 is not needed to run power puzzler 225 or alternatively, power-puzzler 225 can still communicate with the puzzle server 205 over the communication network 210 to access the MPDB 215 and power puzzler cache 230. In some embodiments, the puzzle server 205 and the computing device 220 can be the same computing device and so power-puzzler 225 can be accessed and played locally without need to connect to the communication network 210.

Game Features

The computing system disclosed can be utilized to offer a variety of novel game features.

1. Additional Clues

In some embodiments a puzzler can select additional clues with different levels of difficulty than those presented in the original puzzle. This feature can be useful to a puzzler who is unable to solve a clue in an original puzzle. If a clue of the selected level of difficulty is available, it will be presented, if not, the puzzler can be given the opportunity to select a clue of a higher or lower level of difficulty. A puzzler can continue to request as many additional clues as he or she chooses. Each time a puzzler exhausts the clues of a selected level of difficulty, the puzzler can be given the option of selecting clues of a higher or lower level of difficulty, as applicable. Additional clues can continue to be presented as requested until the puzzler enters a solution, elects to move to another clue, or exhausts the supply of available clues for that solution. In some embodiments, foreign language clues in a number of different languages, such as Chinese, Hindi, Russian, Japanese, French, German, Italian, etc., can also be included in the MPDB and chosen by a puzzler. This can facilitate access and use of power-puzzler to bi-lingual puzzlers or puzzlers for whom English is a second language. Such foreign language clues can include parallel or similar idioms and expressions between the specific language and English where available. In some embodiments, accessing a foreign language clue can enable a link to explanatory materials and dictionaries relating to the solution, which can include pronunciation of the English word or expression and/or the foreign word or expression.

2. Improvement Features

In addition to the ability to select additional clues based on their level of difficulty, in some embodiments power-puzzler can provide certain improvement features to help a puzzler understand and develop crossword strategies, skills and techniques fundamental to success. Improvement features consist of a variety of distinct puzzle attributes which can be individually enabled or deselected by a puzzler. They are intended to demonstrate the value of certain strategies, techniques, skills and approaches to a puzzle and, by doing so, to help a puzzler succeed and improve. Among these improvement features are: (1) BEGIN WITH THE BASICS, (2) CONFIDENCE CHARACTERS, (3) EVEN ONE LETTER, (4) KEEP MOVING/TIMING CUES, (5) HELPFUL ENDINGS, (6) GOOD BEGINNINGS, (7) CHECK or DISCLOSE A LETTER, SOLUTION OR THE ENTIRE PUZZLE, (8) EVEN THE WRONG ANSWER, (9) THINK AGAIN, (10) SHORT & SWEET and (11) YA GOTTA BELIEVE. A puzzler can be able to access an explanation of the purpose and benefit of each improvement feature through the puzzle grid. Each of these features and the manner in which they operate is discussed below.

(1) BEGIN WITH THE BASICS: This unique feature encourages a novice or beginning puzzler to select the puzzle clues from the lowest level of difficulty available. Selection of this feature can highlight those solutions for which a clue with a level of difficulty of 1 is available. If no clue with a level of difficulty of 1 is available, this feature can indicate the lowest level of difficulty clue which is available for that solution. By selecting this feature, those clues can be highlighted on the puzzle. This way a puzzler can start with the easiest clues which can assist in solving harder clues as letters are filled in on the puzzle grid.

(2) CONFIDENCE CHARACTERS: This novel feature can enable a puzzler to distinguish among solutions which s/he has entered to indicate her/his level of confidence in that entry. In some embodiments, a puzzler can be provided with different characters, symbols, icons or colors used to delineate those solutions for each category.

(3) EVEN ONE LETTER: This feature can insert one letter in each solution at the beginning of a puzzle to help a beginning or struggling puzzler recognize the value of even one letter, and particularly the first letter, in arriving at a solution. This feature can encourage puzzlers to be willing to insert individual letters which they believe to be correct even when an entire solution is not known.

(4) KEEP MOVING/TIMING CUES: This feature can limit the time which can be spent on any clue or section of a grid on a puzzler's initial pass through the puzzle until a certain percentage of clues in that section of the grid have been completed or until each clue has been initially addressed. This feature can help every puzzler, no matter how advanced or experienced, understand and remember the benefits of moving through the entire puzzle quickly rather than becoming trapped pondering a particular clue or group of clues without looking at the remaining clues in the puzzle. The times allowed can be restarted for each additional clue selected.

(5) HELPFUL ENDINGS: This feature can direct the puzzler to clues from which s/he can deduce likely parallel word endings in a solution, such as clues in which the operative word in the clue ends in "s, ed, ing, er, ier, est or iest" or a word connoting the same meaning, such as "comparatively" for "er" or "in the process of" for "ing," even though the entire solution may not be known. This feature, combined with the benefits gleaned from the "EVEN ONE LETTER" can help a puzzler to progress more rapidly as well as succeed.

(6) GOOD BEGINNINGS: This feature can direct the puzzler to clues from which s/he can deduce likely beginning letters in a solution such as "re" or "a" for clues which contain the words "over" "again" "anew" indicating the repetition of an act, even though the entire solution may not be known. This feature, combined with the benefits gleaned from the "EVEN ONE LETTER" feature can help a puzzler to progress more rapidly as well as succeed.

(7) CHECK LETTER, SOLUTION OR ENTIRE PUZZLE: This feature can allow the puzzler to determine whether a specific letter, the letters entered in a solution or the letters entered in the entire grid are correct. This feature can indicate, at the request of the puzzler, a letter or letters (in a solution or grid) which are incorrect. If a solution or the entire puzzle is selected to be checked, the puzzle can indicate each incorrect letter, if any.

(8) DISCLOSE LETTER, SOLUTION OR ENTIRE PUZZLE: This feature can allow the puzzler to have any incorrect or open cells filled by the puzzle with the correct letter(s).

(9) EVEN THE WRONG ANSWER: This feature can insert solutions which, while plausible, are not correct, but nevertheless contain certain of the correct letters in some of the intersecting cells. The entry can be denoted by a confidence character suggesting a moderate level of certainty. This feature is intended to demonstrate the value of inserting a possible solution, even if it turns out to be incorrect, because of the potential value of intersecting letters in the puzzle grid.

(10) THINK AGAIN: This feature can highlight certain clues which require additional consideration of the clue or the solution in order to arrive at the correct solution. In many instances, these clues can contain an indication such as a question mark, unusual spelling, or unusual capitalization, which denotes that special consideration is required. In some embodiments, this feature can simply highlight a clue to call the puzzler's attention to the fact that additional thought is required. In some embodiments, the feature can, where appropriate, highlight the specific word or aspect of the clue which requires special consideration.

(11) SHORT & SWEET: This feature can highlight certain clues containing an abbreviation. Such abbreviations can indicate that the answer also contains an abbreviation. It is anticipated that this feature can be disabled by a puzzler once s/he advances beyond beginning levels.

(12) YA GOTTA BELIEVE: This feature can highlight either a specific cell or cells in a puzzle grid when the solution requires that something other than a single alphabetic letter be inserted in the cell or cells. It can also highlight a specific cell or cells when the solution calls for insertion of something other than a word. An example is a solution which calls for the insertion of "BBBB" in place of the word "BEES" or the insertion "IIII" in place of the word "EYES" or "III" in place of "IZE". The title of this improvement feature is a reminder that when a puzzler concludes that a simple letter or a standard word will not fit in the allotted cells, but is certain that s/he knows the correct solution, s/he must have the confidence to insert what s/he believes to be correct.

Customized Puzzles

In some embodiments, a puzzler can customize puzzles based on parameters selected by the puzzler. For example, the power-puzzler application can prompt a puzzler to choose from several parameters such as difficulty level, number of clues, categories, etc. Once the parameters are entered, power-puzzler can search the MPDB for clues and answers matching the entered parameters and use them to create a puzzle.

Creating a puzzle exactly matching the parameters specified by the puzzler may not always be possible. This type of situation can be handled in numerous ways. In some embodiments, the puzzler can be prompted to prioritize their parameters. For example, a puzzler can set parameters so that only clues from the sports and music category are used and that all clues have a difficulty level under 3. The puzzler can prioritize these selections so that including clues from sports and music is more important than all clues having a difficulty level under 3. If there are not enough clues in the database to create the puzzle based on the chosen parameters, power-puzzler will give priority to the sports and music category and can use clues from these categories with a difficulty level higher than 3 rather than use clues with a difficulty level under 3 but from a different category. In some embodiments, power-puzzler can make the puzzle as close to the puzzlers' selections while inserting other clues as necessary without consulting the puzzler. In some embodiments, power-puzzler can notify the puzzler that the puzzle is not possible as requested and suggest changes to the chosen parameters that will result in a puzzle being created.

In some embodiments, the puzzler can customize a puzzle based on parameters unique to that puzzler. For example, a puzzler with a limited amount of time may wish to create and play a puzzle which should take only 30 minutes to complete. The power-puzzler application can access the data stored in the puzzler's user profile and estimate a combination of clues and answers to include, which, based on available data about the puzzler to complete questions of certain difficulty and in certain categories, should take the puzzler the chosen time to fully complete. The more puzzles a puzzler solves, the greater the amount of data collected in the puzzler's user profile and the more accurate this feature can be.

Scoring

Power-puzzler can also offer unique and customizable scoring options which will take advantage of power-puzzler's unique technologies and facilitate both competition and cooperation between and among puzzlers. The scoring system can be based on multiple variables such as the level of difficulty of the clues in the original puzzle, the number of additional clues requested by the puzzler and their levels of difficulty, the time taken to enter an individual solution or to complete an entire puzzle, the percentage of solutions correctly completed, use of various improvement features, etc.

The scoring can be configured in any number of ways. For example, in some embodiments, each variable will be assigned a value in the scoring system to approximate the level of skill evidenced by the completion of that particular puzzle in the time taken. The highest score possible for an individual can be based on accurately completing an entire puzzle, with clues from the highest level of difficulty, in the shortest amount of time without any assistance from the system in providing additional clues, or other improvement features. In this type of embodiment, points can be deducted from the score based on the number of requests for additional clues and the level of difficulty of the requested clues as well as the time taken to solve the clues. For example, a clue in the science category with a difficulty level of 5 can be assigned 10 points if the correct solution is entered by the puzzler within a predetermined period of time. From that score points can be deducted for each additional clue the puzzler requested. For example, if a puzzler requested an additional clue with a difficulty level of 1, 5 points can be deducted. If instead the puzzler had requested an additional clue of difficulty level 4 only 1 point might be deducted.

A similar system can be used to score based on time. In some embodiments, a predetermined time can be set to solve a clue based on difficulty level. If a puzzler enters the solution prior to this time expiring, the puzzler can be awarded full points, if the puzzler does not enter the solution within the predetermined time, points can be deducted. In some embodiments, there can be multiple predetermined times so that a puzzler will have more points deducted the longer it takes for them to enter the solution. In some embodiments, scoring based on time can be based on the completion of the entire puzzle rather than based on individual answers.

When a puzzle is completed by a puzzler, a score can also be given based on the percentage of correct solutions and this score can be added to the total. For example, a puzzler can be awarded 50 points for completing the puzzle and that score can be reduced based on the percentage of correct solutions given. If a puzzler correctly entered 100% of the solutions then the puzzler would be awarded the full 50 points. If, however, the puzzler only entered 80% of the solutions correctly, the puzzler would only be awarded 80% of the 50 points, i.e., only 40 points. This total can then be added to the point total scored for solving the individual clues.

In some embodiments, a final score can be calculated by multiplying the total score earned from solving clues by the percentage of correct solutions. For example, if a puzzler earned 100 points from solving clues and, upon completing the puzzle it is determined that the puzzler only solved 80% of the clues correctly, the puzzler's total score would be 80 points. If, however, the puzzler solved 100% of the clues correctly, the puzzler would receive the full 100 points.

Figure 4:
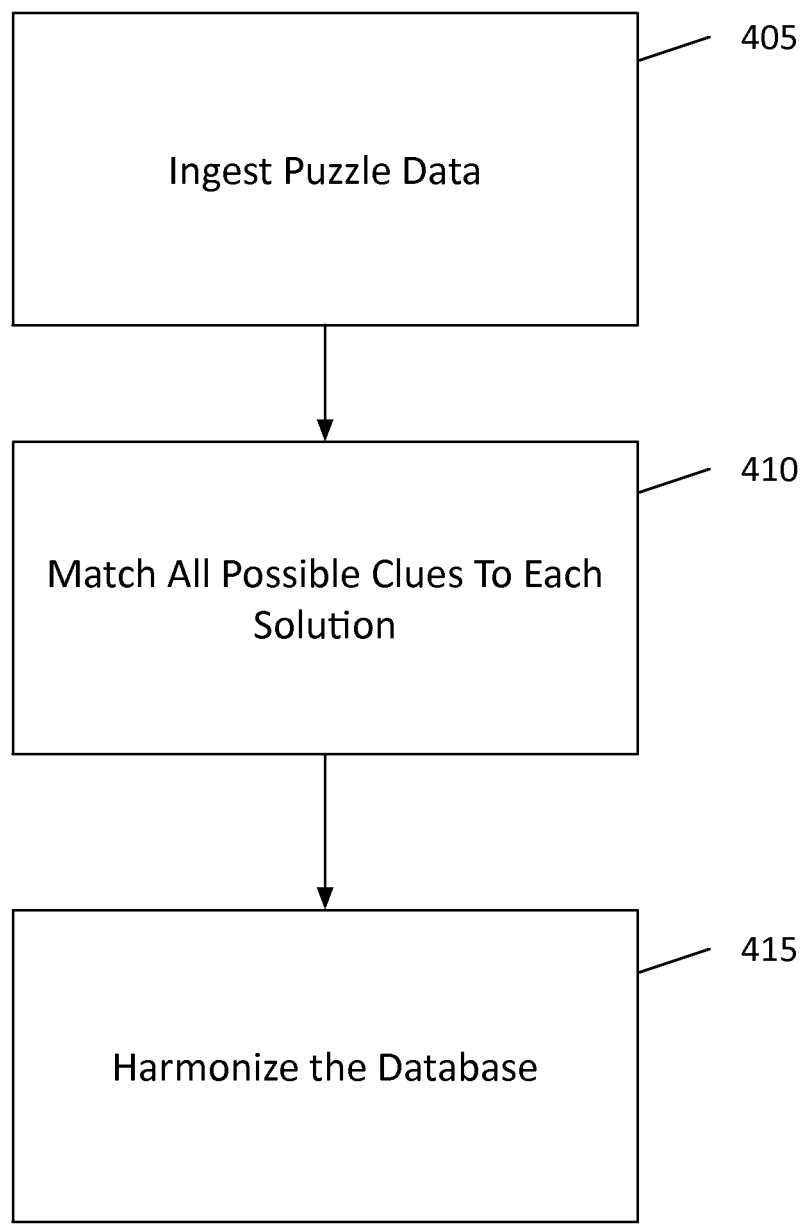
FIG. 4 illustrates an exemplary method embodiment of creating a master puzzler database.

FIG. 4 illustrates an exemplary method embodiment of creating a master puzzler database. At step 405 puzzle data is ingested by a puzzle server. Puzzle data can include clues associated with solutions as well as metadata describing the clues and solutions. The metadata can include level of difficulty, source, categories, links to further information, notes, etc. The metadata associated with the puzzle data can be included from the source prior to the puzzle data being ingested. For example, puzzle data published in certain newspapers already has a difficulty level associated with it based on the day of the week the puzzle is published. Puzzle data can be ingested from any possible electronic format. Puzzle data not in electronic format can be converted from its original source into electronic format through the use of scanners and electronic character recognition software. Alternatively, puzzle data can be manually entered into the master puzzler database. The ingested puzzle data can be stored in the master puzzler database.

At step 410 solutions can be matched with all stored clues to which the solution correctly solves the clue. Therefore, multiple clues can be associated with a single solution.

At step 415 the clues and solutions can be 'harmonized' to fit with multiple forms of the same base word to create the greatest possible number and variety of clues and solutions. For example, the clue "headwear" calling for the solution "hat" can be converted to be compatible with either the solution "hat" or "hats." Alternatively, if the clue is "sombrero" both the clue and the solution can be converted so that the clue "sombreros" is created and requires the solution "hats." The same process can be used with verb-based solutions. For example, the clue "have fun" calling for the solution "play," can be harmonized to be compatible with the solutions "plays," "played," and "playing" by converting the clue to "has fun," "had fun," and "having fun," as necessary.

Figure 5:
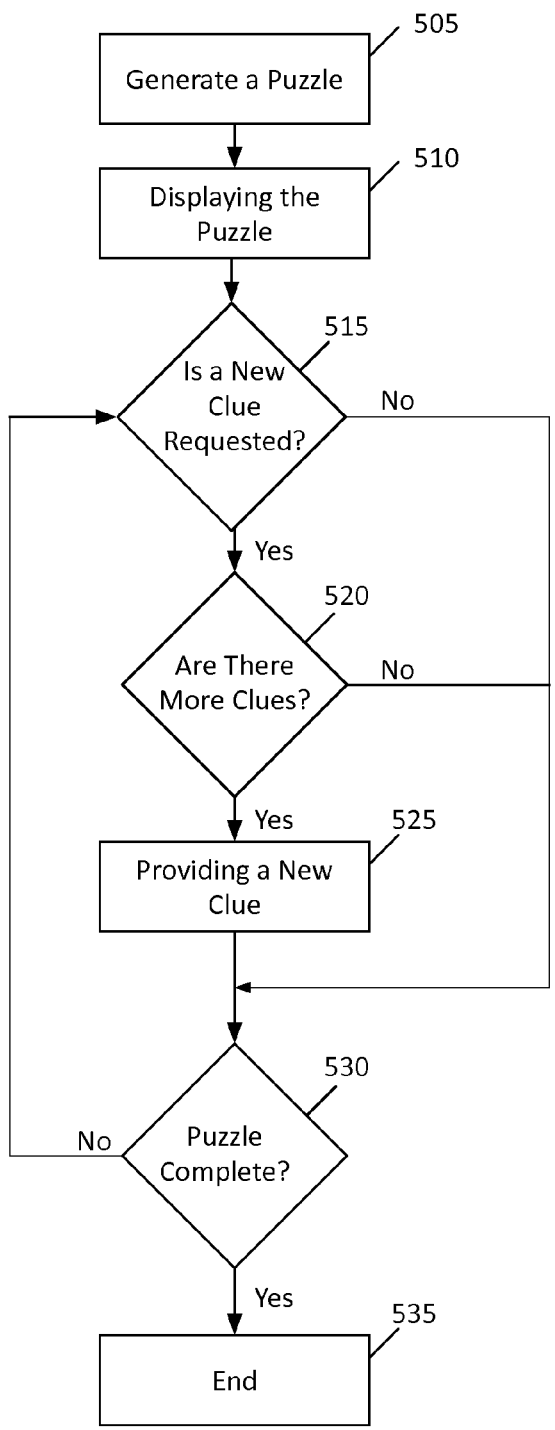
FIG. 5 illustrates an exemplary method embodiment of providing a puzzle to a user.

FIG. 5 illustrates an exemplary method embodiment of providing a puzzle to a user. At 505 a puzzle is generated. The puzzle can be generated by using data stored in a database. This data can include clues associated with solutions as well as metadata describing each. The metadata can include level of difficulty, categories, notes, links to associated data, etc. The puzzle can be generated by a processor in communication with the database and configured to search and extract data from the database.

Once generated, the puzzle can be displayed 510 to a user. The puzzle can be displayed on any computing device capable of displaying graphics. For example, the puzzle can be displayed on a computer monitor connected to a home computer or a handheld computing device such as a cellular phone, e-reader, or tablet computer. The puzzle can be displayed so that the only the clue is displayed to the user. In some embodiments visual indicators of the solution can also be displayed. For example, cells representing each letter in the solution can be displayed so that the user can determine the number of letters or characters in the solution. Once displayed, a user can attempt to solve each clue in the puzzle.

A user having difficulty arriving at a solution can request another clue 515 to the same solution (or in some embodiments select other of the puzzle improvement features discussed above). If a new clue is requested 515, the processor then determines whether any further alternate clues are available 520 for the chosen solution in the database. If another clue is available, the new clue is provided 525, if not, no clue is provided.

At 530 it is determined whether the puzzle has been completed. The puzzle can be completed in numerous ways. In some embodiments, the puzzle is completed when a user has inserted a solution for each clue. In some embodiments, the puzzle is completed by a predetermined amount of time expiring. In some embodiments, the puzzle is completed by a user electing to end the puzzle. If it is determined that the puzzle is complete, the method ends 535. If the puzzle is not complete, the method can continue to determine whether a new clue has been requested 515.

In some embodiments, a puzzle can be provided to and played by multiple puzzlers at the same time or asynchronously, either collaboratively or competitively. Multiple puzzlers can access and play the same puzzle while at various locations using the same or multiple computing devices. In some embodiments the puzzle can be accessed via a client through an online sever. In some embodiments the online sever performs remote processing and storage while the client can be an access point. For example, in some embodiments puzzlers can access a puzzle application from a social networking site. In some embodiments puzzlers can access a puzzle through a game center application. In some embodiments puzzlers can access a puzzle through a website.

In some embodiments, a group of puzzlers can create and work on the same puzzle or group of puzzles at the same time as a team. Puzzlers can log in to the same puzzles and solve clues until the puzzles are completed. In some embodiments the puzzles can be too large to finish at once or the puzzlers may not have the time to finish the puzzles in one session. In this type of embodiment, puzzlers can log in and out of the puzzles and play asynchronously as a team. Puzzlers can be scored as a team, individually, or both.

In some embodiments a puzzler or team of puzzlers can compete with another puzzler or team of puzzlers directly. For example, the same puzzle or group of puzzles can be presented to both teams and a winner can be declared based on predetermined criteria. For example, in some embodiments, a winner can be based on which team finishes the puzzles in the shortest amount of time. In some embodiments a winner can be declared based on an overall score earned by each team. Puzzlers can be scored individually or as a team.

When multiple puzzlers are playing collaboratively or competitively, user profile data can be used to handicap puzzlers to facilitate even gameplay and encourage puzzlers of all skill levels to compete against each other regardless of the skill level of their opponent. In some embodiments the final score can be adjusted based on the skill level of the puzzlers on a team. For example, a puzzler with a lower skill level can receive a set number of extra points based on the disparity between their skill level and that of their opponent. Alternatively, the points can be deducted from the puzzler with a higher skill level based on the same criteria. In some embodiments a puzzler with a lower skill level can be allotted a greater amount of time than a puzzler with a greater skill level to solve a clue without a negative impact on their score. In some embodiments a puzzler with a lower skill level can receive more points for solving a clue of a specified difficulty level than can be awarded to a puzzler with a higher skill level. In some embodiments how the puzzle is presented to a puzzler can be varied based on the skill level of the puzzler. For example, in some embodiments a puzzler can be presented with clues based on their skill level such that puzzlers with a higher skill level are presented with clues with a higher difficulty or from categories from which the puzzler has not performed as well as determined by previous user profile data, while a puzzler with a lower skill level will be presented with clues with a lower difficulty level or from categories which the puzzler has performed well in the past or has identified as categories of interest. In some embodiments the improvement features offered to a puzzler can be limited based on their skill level such that a puzzler with a higher skill level has few, if any, improvement features available while a puzzler with a low skill level has most, if not all, improvement features available. In some embodiments the effectiveness of an individual improvement feature can be varied based on the skill level of a puzzler. For example, in some embodiments a puzzler with a higher skill level can only be presented with a letter from the middle of a word when using the EVEN ONE LETTER improvement feature while a puzzler with a lower skill level can be presented with the first letter which is considered a more effective hint.

Figure 6:
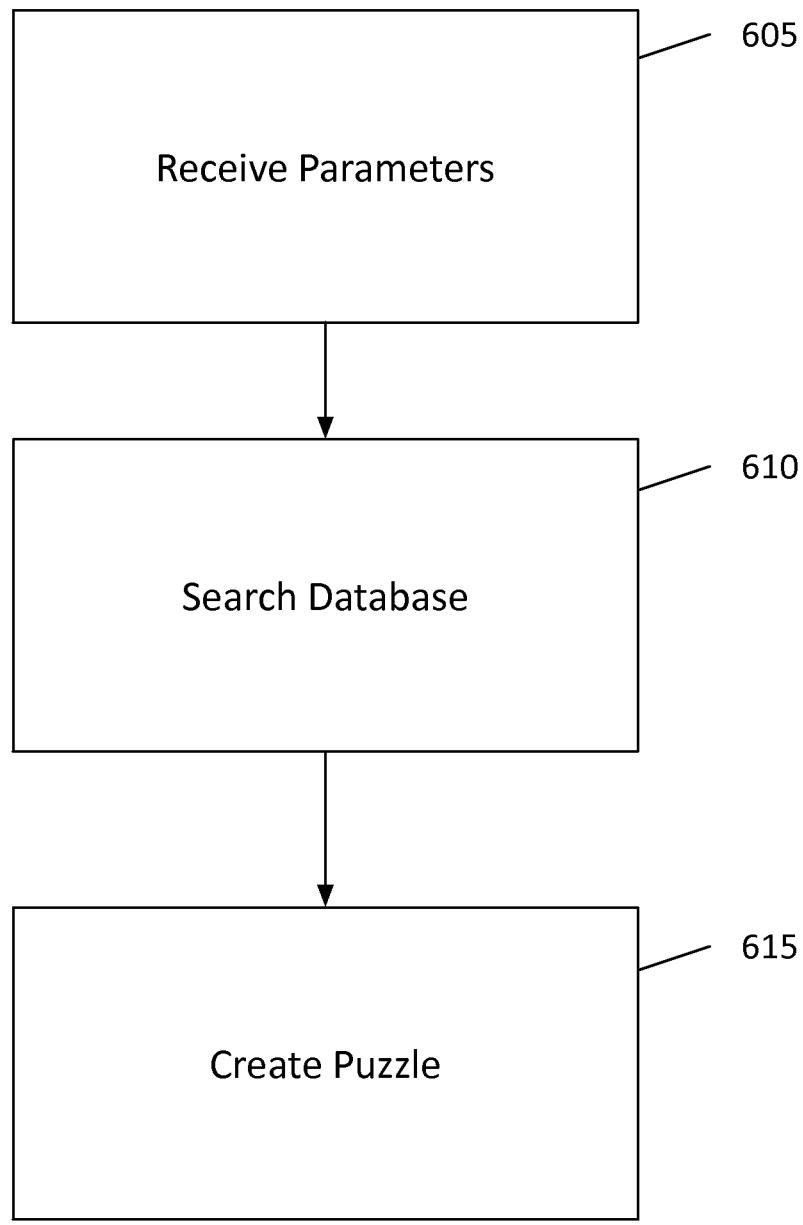
FIG. 6 illustrates an exemplary method of creating a puzzle customized by a user.

FIG. 6 illustrates an exemplary method of creating a puzzle customized by a user. At step 605 parameters are received at the server. The parameters can be any parameters used to define the scope of the puzzle. Parameters can include puzzle size, number of solutions, level of difficulty, number of alternate clues, categories, etc. For example, a user can set the parameters for a puzzle to 20 solutions with only clues over a difficulty level of 4 and in the sports and music category. In addition to picking parameters, the user can also define priority for the selected parameters in case creating a puzzle with the exact combination of selected variables is not possible. Once the parameters have been received 605, the database is searched 610 for clues and solutions matching the defined parameters. If not enough matches are found, the remaining solutions can be chosen taking into account the priority values defined by the user. For example, a user can select as parameters (1) 10 solutions included in the puzzle, (2) each associated with clues with a difficulty rating over 4, (3) in the sports category, and (4) with priority given to clues within the sports category over those having a clue with a difficulty rating over 4. If upon searching, only 9 solutions were found matching those parameters, the system can choose a $10^{th}$ solution from the sports category with a difficulty rating under 4 (if available) rather than one with a difficulty rating over 4 but from a different category. Once all the data is chosen, the puzzle is created 615.

Figure 7:
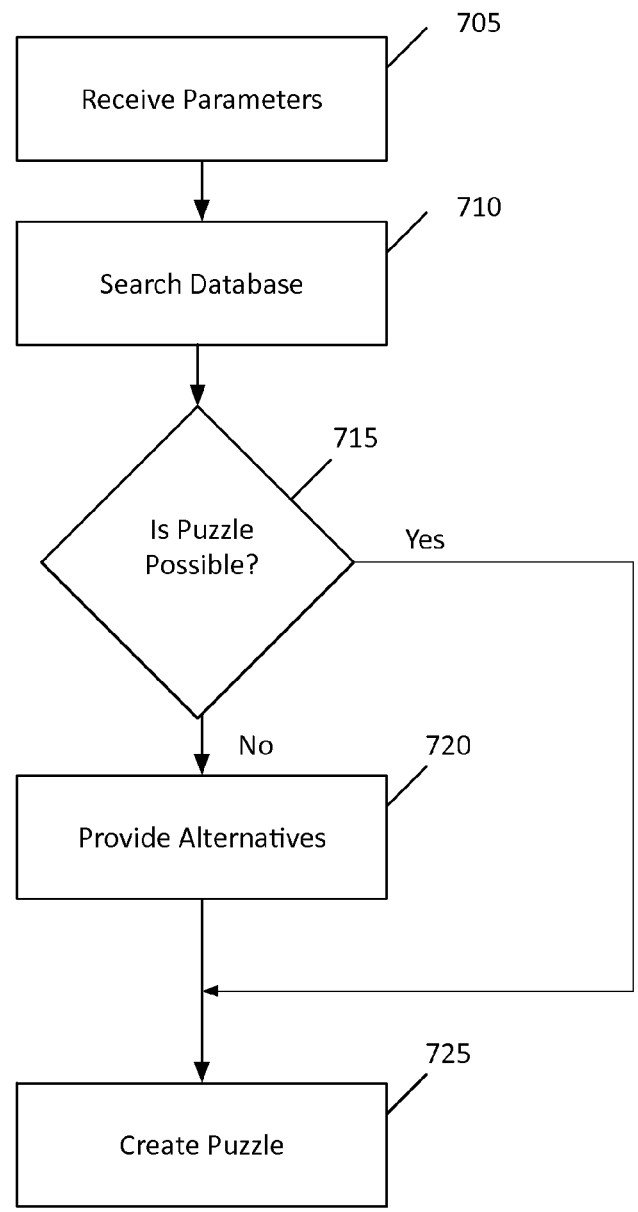
FIG. 7 illustrates another exemplary method of creating a puzzle customized by a user.

FIG. 7 illustrates another exemplary method of creating a puzzle customized by a user. At 705 parameters entered by the user are received and at 710 the database is searched for clues and solutions matching the entered parameters. If enough clues and solutions are received 715, then the puzzle is created 725. If, however, it is determined that there are not enough clues and answers to create the puzzle based on the entered parameters 715, the user is prompted with possible solutions 720. For example, in some embodiments the system can determine possible changes to the entered parameters which will result in a puzzle being created. These changes can be based on the entered parameters to keep the parameters as close to the chosen parameters as possible. For example, if a user selects to have only clues with a difficulty level over 3, the system can suggest changing it to clues with a difficulty level over 2, if the change will result in a puzzle being created. Multiple options can be presented to the user. Once a selection is made, the puzzle is created. In some embodiments, the puzzle is created close to the original parameters, by including all clues and solutions exactly matching the user's original parameters, and only filling in the rest with those within the modified parameters.

Figure 8:
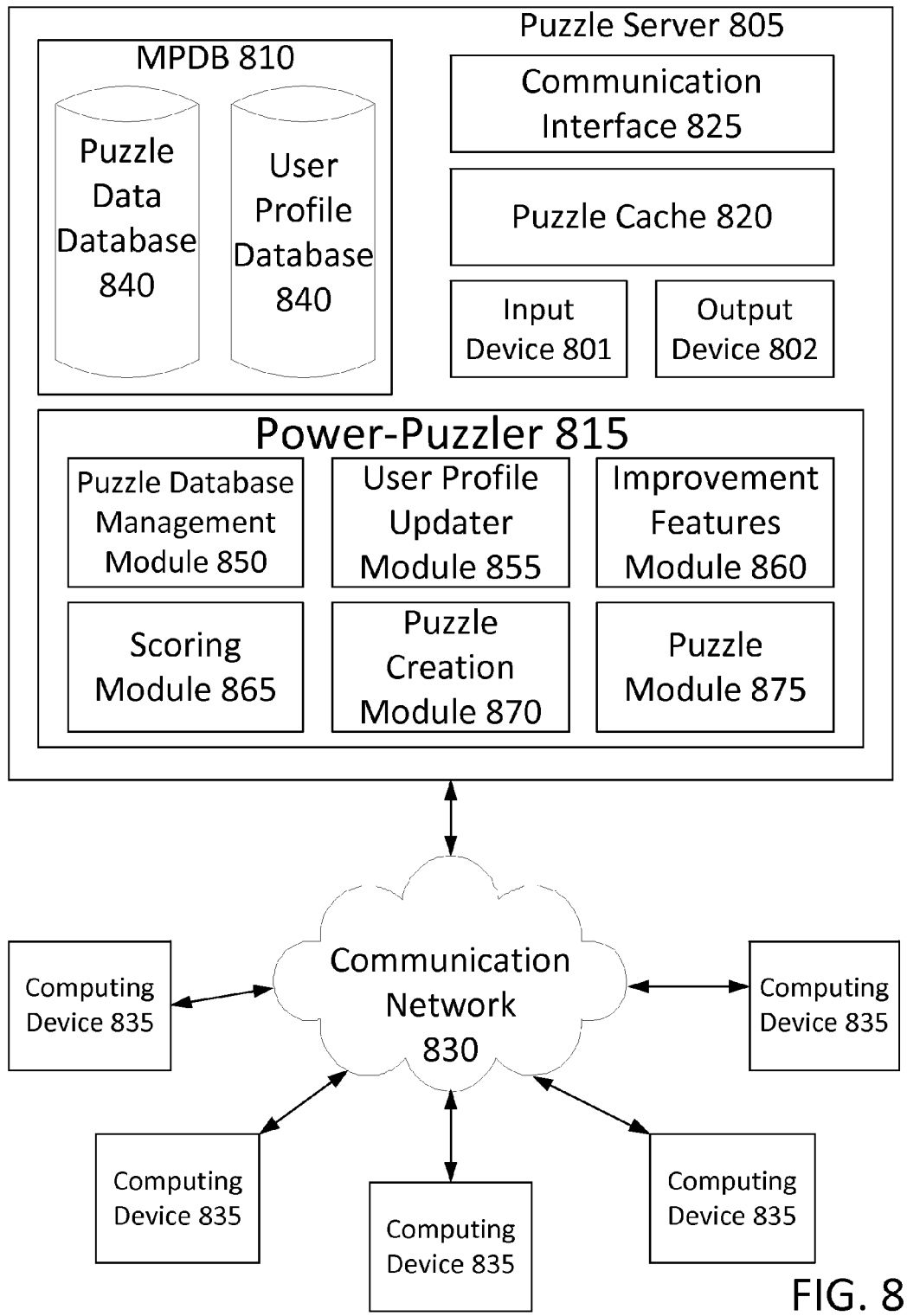
FIG. 8 illustrates an exemplary system embodiment of the puzzle server.

FIG. 8. Illustrates an exemplary embodiment of the puzzle server. As illustrated, the puzzle server can include a master puzzler database (MPDB) 810, a power puzzler application 815, a puzzle cache 820 communication interface 825, input device 801 and output device 802. The input device 801 can be any type of input device configured to work with a computing device such as a keyboard, mouse, touchpad, microphone, etc. The output device 802 can be any type of output device configured to work with a computing system such as a monitor, touchscreen, speakers, etc. The communication interface 825 can be configured to communicate with multiple computing devices 835 through use of a communication network 830.

The MPDB 810 can consist of multiple databases. In some embodiments, the MPDB 810 includes a puzzle database 840 and a user profile database 845. The puzzle database 840 can be used to store puzzle data including clues and solutions as well as metadata associated with the clues and solutions. The user profile database 845 can be used to store user profile data regarding a puzzler. This data can include personal data including demographic information about the puzzler such as name, age, sex, educational background, occupation, geographical residences etc., as well as preference information such as the puzzler's likes and dislikes. The user profile database 845 can also store data regarding a puzzler's performance solving puzzles, such as number of puzzles solved, time taken to solve puzzles, difficulty level of clues, percentage of solutions entered correctly, etc.

The power-puzzler application 815 can be configured to interact with the MPDB 810 to create and provide interactive puzzles to puzzlers. The power-puzzler application 815 can consist of multiple modules. As illustrated, the power-puzzle application 825 can consist of a puzzle database management module 850, a user profile updater module 855, improvement features module 860, scoring module 865, puzzle creation module 870 and a puzzle module 875.

The puzzle database management module 850 can be configured to interact with the puzzle database 840 to add and organize puzzle data in the puzzle database 840. The puzzle database management module 850 can be configured to receive puzzle data through an input device 801 or the communication interface 805. Once the data is received, the puzzle database management module 850 can store the puzzle data in the puzzle database 840. Each clue and its solution can be stored in the puzzle data base 840 as independent but related elements. The puzzle database management module 850 can also be configured to match solutions stored in the database with all clues to which the solution can be properly derived from the clue, thus resulting in multiple clues being associated with a single solution. In some embodiments, the puzzle database management module 850 can achieve this by comparing each solution to each other and combining any identical solutions. In some embodiments, the puzzle database management system 850 can be configured to compare a newly received solution as it is being entered against the solutions already present in the puzzle data database 840. If a match is found, a new clue can be added to the puzzle database 840 and related to the already existing solution entry.

Additionally, the puzzle database management system 850 can be configured to create a greater number and variety of clues and solutions within the puzzle data database 840 by "harmonizing" the puzzle data. Harmonizing can include converting clues and solutions to fit with multiple forms of the same base word, to the extent possible. For example, the clue "headwear" calling for the solution "hat" can be converted to be compatible with either the solution "hat" or "hats." Alternatively, if the clue is "sombrero" both the clue and the solution can be converted so that the clue "sombreros" is created and requires the solution "hats." The same process can be used with verb-based solutions. For example, the clue "have fun" calling for the solution "play," can be harmonized to be compatible with the solutions "plays," "played," and "playing" by converting the clue to "has fun," "had fun," and "having fun," as necessary. In some embodiments the puzzle database management system 850 can accomplish this by identifying root words and then referencing them against a word database to identify alternate forms. In some embodiments, the database management system can be configured to harmonize the puzzle data with foreign language dictionaries so that a clue or solution can be converted into a different language.

The user profile updater module 855 can be configured to collect user profile data and interact with the user profile database 845 to store the profile data in the user profile database 845. The user profile update module 855 can collect user profile data about a puzzler, such as name, age, sex, educational background, occupation, history of geographic residences, preferences, etc. In some embodiments the user profile data can be entered by a user through use of an input device 801. In some embodiments the user profile data can be received from a computing device 835 over the communication network 830 using the communication interface 825. In addition to personal profile data, the user profile update module 855 can also gather data regarding a puzzler's performance solving puzzles, such as number of puzzles solved, time taken to solve puzzles, difficulty level of clues, percentage of solutions entered correctly, etc. Once profile data is gathered, the user profile update module 855 can update a puzzler's user profile data stored in the user profile database 840, or, if one does not already exist, create a user profile for the puzzler in the user profile database 845 and store the data.

The puzzle creation module 870 can be configured to create puzzles. The puzzle creation module 870 can be configured to interact with the puzzle database 840 and the user profile database 845 as well as receive input from the communication interface 825 or the input device 801. The puzzle creation module 870 can be configured to create puzzles based on puzzle parameters. Puzzle parameters can include any type of parameter that can be used in defining the scope of the puzzle. For example, puzzle parameters can include the number of clues and solutions, the difficulty level of clues, categories of the clues, etc. The puzzle creation module 870 can search the puzzle database 840 for clues and solutions conforming to the puzzle parameters. In some embodiments the puzzle parameters are set for a standard puzzle. In some embodiments the puzzler can choose between several choices of puzzles such as easy, medium and hard and the parameters will be preset based on the puzzler's selection. In some embodiments the puzzler can fully customize a puzzle by entering specific parameters such as the exact number of solutions, the difficulty level range for clues, and categories of clues. Parameters can be received through the input device 801 or the communication interface 825. Once the clues and solutions have been chosen from the puzzle database 840, the puzzle creation module 870 can create the puzzles using any known puzzle creation algorithm. The puzzle creation module 870 can store created puzzles in the puzzle cache 820.

The puzzle creation module 870 can also create puzzles based on puzzle parameters which are tailored to a unique puzzler. For example, in some embodiments, a puzzler can set a puzzle parameter to create a puzzle to be solved within 30 minutes. The time for a puzzle to be solved varies based on many factors such as a puzzler's skill level and knowledge level in particular categories. The puzzle creation module 870 can be configured to use profile data stored about a specific puzzler to approximate parameters to create a puzzle conforming to the puzzlers given time frame. For example, the data in the puzzler's user profile can include the time taken for the puzzler to solve clues of different difficulty levels and in different categories. Based on these statistics, the puzzle creation module 870 can determine parameters to create a puzzle to be completed in the given time frame. For example, the data in the user profile can indicate that a puzzler, on average, completes clues with a difficulty level of 3 or under in 3 minutes and clues with a difficulty level over 3 in 7 minutes. Based on this user profile data, the puzzle creation module 870 can choose 3 clues with a difficulty level over 3 and 3 clues with a difficulty of 3 or under to create the puzzle that should take the puzzler 30 minutes to complete.

The puzzle creation module 870 can also be configured to create a puzzle when creating a puzzle complying exactly with the given parameters is not possible. In some embodiments the puzzle creation module can choose clues and answers not complying with the parameters based on priority values assigned to the parameters so that the created puzzle complies to the chosen parameters first and then to the assigned priority values. The priority values can be received from a puzzler via the input device 801 or the communication interface 825. In some embodiments the puzzle creation module 870 can determine changes to the parameters that would result in a puzzle being created. In some embodiments, these changes to the parameters can be presented to the puzzler for approval. In some embodiments the changes can be determined to be as close to the original parameters as possible. In some embodiments multiple possible changes can be determined and presented to the puzzler for the puzzler to select. The changes chosen can then be used to create the puzzle.

The puzzle module 875 can be configured to provide a graphical interface puzzle game to puzzlers in which a puzzler can view a puzzle as well as enter solutions. In some embodiments the puzzle can be played on the puzzle server 805 and so the puzzle can be output via the output device 802 and a puzzler's input can be received via the input device 802. In some embodiments a puzzler can play the puzzle from their remote computing device 835 and so the puzzle module can output puzzles via the communication interface to be sent to the computing device 835 via the communication network 830. Puzzler input can also be received from the computing device 835 by the communication interface 825 via the communication network 830. In some embodiments, the puzzle can be played by multiple puzzlers and can be provided at multiple computing devices 835 via the communication network 830. For example, the puzzle can be accessed from the puzzle server 805 by puzzlers through a social networking site. In addition to offering the puzzle, the puzzle module can also be configured to allow a puzzler to request different clues corresponding to the same solution. Upon receiving a request, the puzzle module will provide a new clue which corresponds to the same solution. In some embodiments the puzzle module can be configured to interact with the puzzle database 840 to retrieve new clues. In some embodiments the puzzle creation module 870 stores all additional clues associated with the solutions in the puzzle cache 820 when creating the puzzle and the puzzle module 875 can retrieve the additional clues without interacting with the puzzle data database 840. The puzzle module 875 can also be configured to interact with the improvement features module 860 and the scoring module 865.

The improvement features module 860 can be configured to apply any of the improvement features to a puzzle being provided by the puzzle module 875. In some embodiments the puzzle module 875 receives input from the puzzler to invoke an improvement feature and then communicates the request to the improvement features module 860 which implements the requested feature. In some embodiments a puzzler's input directly requests the puzzle feature from the improvement features module 860.

The scoring module can be configured to receive information from the puzzle module in calculating a score. In some embodiments the scoring module can receive input to configure how the score is calculated. In some embodiments the scoring module can calculate a score based on a default scoring calculation. The scoring module can also be configured to communicate with the user profile database to store data concerning a puzzler's performance in the user profile database. This data can include the calculated score as well as performance data used in calculating the score.

In some embodiments, advertisements can be presented to puzzlers in association with a puzzle. Advertisements can be provided by an advertising server that can select and provide advertisements on the basis of the puzzlers profile or on the basis of puzzle clues or solutions, as well as other factors. The advertising server can work in cooperation with the puzzle server which can request the advertisement, or the advertising server can work in cooperation with the user device, which can request the advertisement. In some embodiments, the puzzle application on the client device can request an advertisement either directly from the advertisement server or through the puzzle server.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A method comprising:
   presenting to a first player of a computer-generated crossword puzzle, a first clue to derive a first solution of the computer-generated crossword puzzle;
   receiving, from the first player, an alternate clue request identifying a desired level of difficulty for an alternate clue, different that the first clue, to derive the first solution; and
   upon a determination that an alternate clue, different than the first clue, of the desired level of difficulty is available, presenting, to the first player, the alternate clue to derive the first solution.

2. The method of claim 1, further comprising:
   comparing the desired level of difficulty identified by the alternate clue request with metadata associated with the alternate clue, wherein the metadata identifies the level of difficulty of the alternate clue.

3. The method of claim 1, further comprising:
   receiving, from the first player, an improvement feature request identifying an improvement feature to be applied to the computer-generated crossword puzzle; and
   applying the improvement feature identified by the improvement feature request to the computer-generated crossword puzzle, wherein the improvement feature provides additional information to derive the first solution.

4. The method of claim 3, wherein the improvement feature includes providing the first player with a confidence character to denote a level of certitude in an entered solution.

5. The method of claim 3, wherein the improvement feature sets a limited amount of time to derive the first solution.

6. The method of claim 3, wherein the improvement feature presents an incorrect solution, wherein the incorrect solution includes at least one letter shared with the solution.

7. The method of claim 3, wherein the improvement identifies that the clue includes an indication that the solution includes an abbreviation.

8. The method of claim 1, further comprising:
   generating a score based on an amount of time taken by the first user to derive the solution.

9. A non-transitory computer-readable medium containing instructions that, when executed by a computing device, cause the computing device to:
   present, to a first player of a computer-generated crossword puzzle, a first clue to derive a first solution of the computer-generated crossword puzzle;
   receive, from the first player, an alternate clue request identifying a desired level of difficulty for an alternate clue, different than the first clue, to derive the first solution; and
   upon a determination that an alternate clue, different than the first clue, of the desired level of difficulty is available, present, to the first player, the alternate clue to derive the first solution.

10. The non-transitory computer-readable medium of claim 9, wherein the instructions further cause the computing device to:
    compare the desired level of difficulty identified by the alternate clue request with metadata associated with the alternate clue, wherein the metadata identifies the level of difficulty of the alternate clue.

11. The non-transitory computer-readable medium of claim 9, wherein the instructions further cause the computing device to:
    receive, from the first player, an improvement feature request identifying an improvement feature to be applied to the computer-generated crossword puzzle; and
    apply the improvement feature identified by the improvement feature request to the computer-generated crossword puzzle, wherein the improvement feature provides additional information to derive the first solution.

12. The non-transitory computer-readable medium of claim 11, wherein the instructions further cause the computing device to:
    generate a score based on a number of improvement features applied to the computer-generated crossword puzzle.

13. The non-transitory computer-readable medium of claim 12, wherein the instructions further cause the computing device to:
    generate a score based on a number of alternate clues requested by the first user.

14. The non-transitory computer-readable medium of claim 13, wherein the
    score is generated based on a level of difficulty associated with the alternate clues.

15. The non-transitory computer-readable medium of claim 11, wherein the instructions further cause the computing device to:
    generate a score based on an amount of time taken by the first user to derive the first solution.

16. A system comprising:
    a processor; and
    a memory containing instructions that, when executed, cause the processor to:

present to a first player of a computer-generated crossword puzzle, a first clue to derive a first solution of the computer-generated crossword puzzle;

receive, from the first player, an alternate clue request identifying a desired level of difficulty for an alternate clue, different than the first clue, to derive the first solution; and upon a determination that an alternate clue, different than the first clue, of the desired level of difficulty is available, present, to the first player, the alternate clue to derive the first solution.

17. The system of claim 16, wherein the instructions further cause the processor to:

receive, from the first player, a desired level of puzzle difficulty for the computer-generated crossword puzzle; and generate the computer-generated crossword puzzle based, at least partially, on the desired level of puzzle difficulty received from the first user.

18. The system of claim 17, wherein generating the computer-generated crossword puzzle includes:

selecting a solution to include in the computer-generated crossword puzzle, wherein the solution selected is associated with at least one clue that has a level of difficulty equal to the desired level of puzzle difficulty received from the first user.

19. The system of claim 17, wherein the instructions further cause the processor to:

receive, from the first player, a desired puzzle topic for the computer-generated crossword puzzle, wherein the computer generated crossword puzzle is generated based, at least partially, on the desired puzzle topic received from the first user.

20. The system of claim 19, wherein the instructions further cause the processor to:

select a solution to include in the computer-generated crossword puzzle, wherein the solution selected is associated with at least one clue that has a level of difficulty equal to the desired level of puzzle difficulty received from the first user, and a topic equal to the desired puzzle topic received from the first user.

* * * * *